Oct. 19, 1943.  F. REINER  2,332,166
FORM FOR MAKING CONCRETE WALLS
Filed May 25, 1942  6 Sheets-Sheet 1
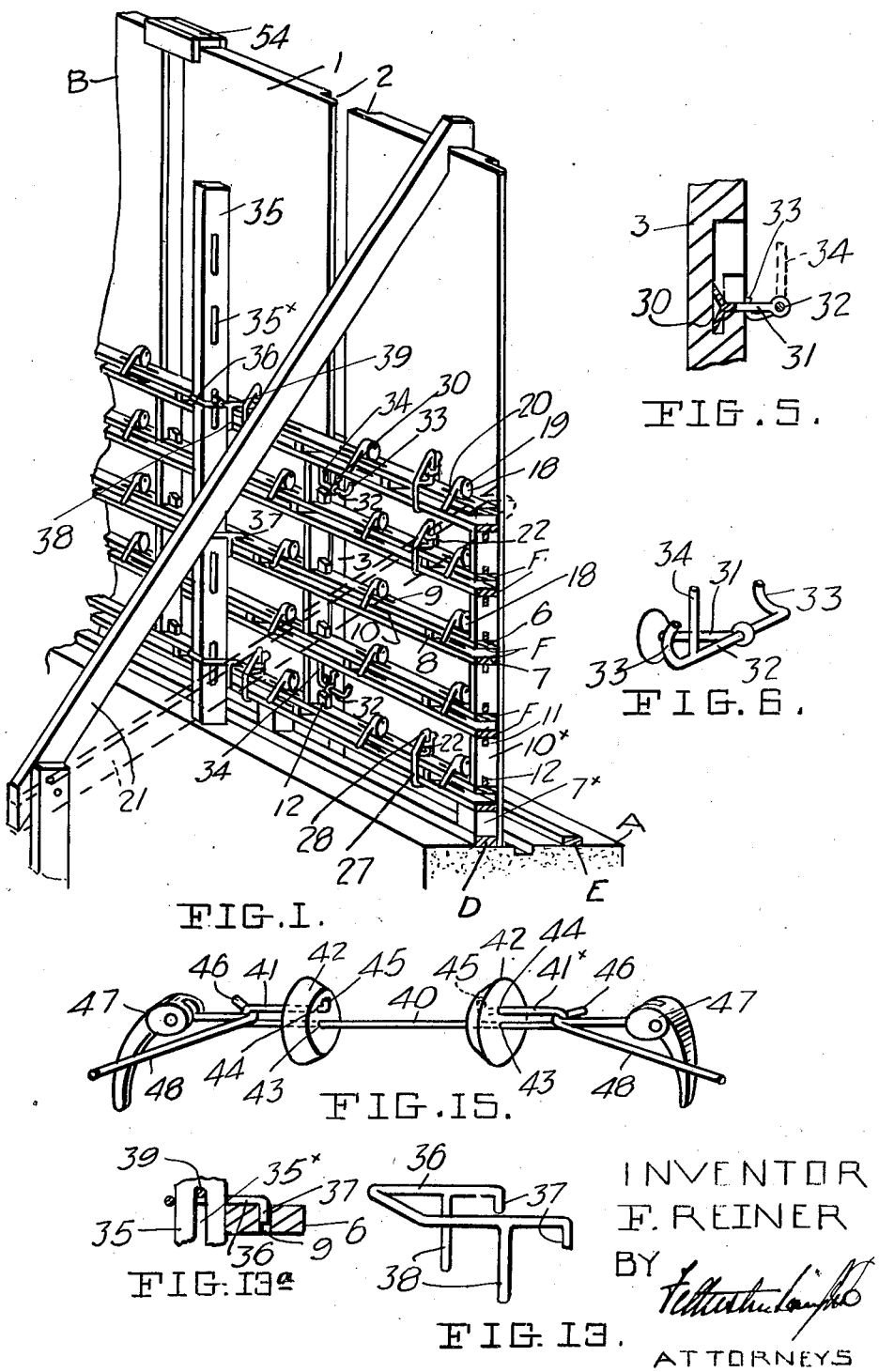
INVENTOR
F. REINER
BY
ATTORNEYS Oct. 19, 1943.  F. REINER  2,332,166
FORM FOR MAKING CONCRETE WALLS
Filed May 25, 1942   6 Sheets-Sheet 2
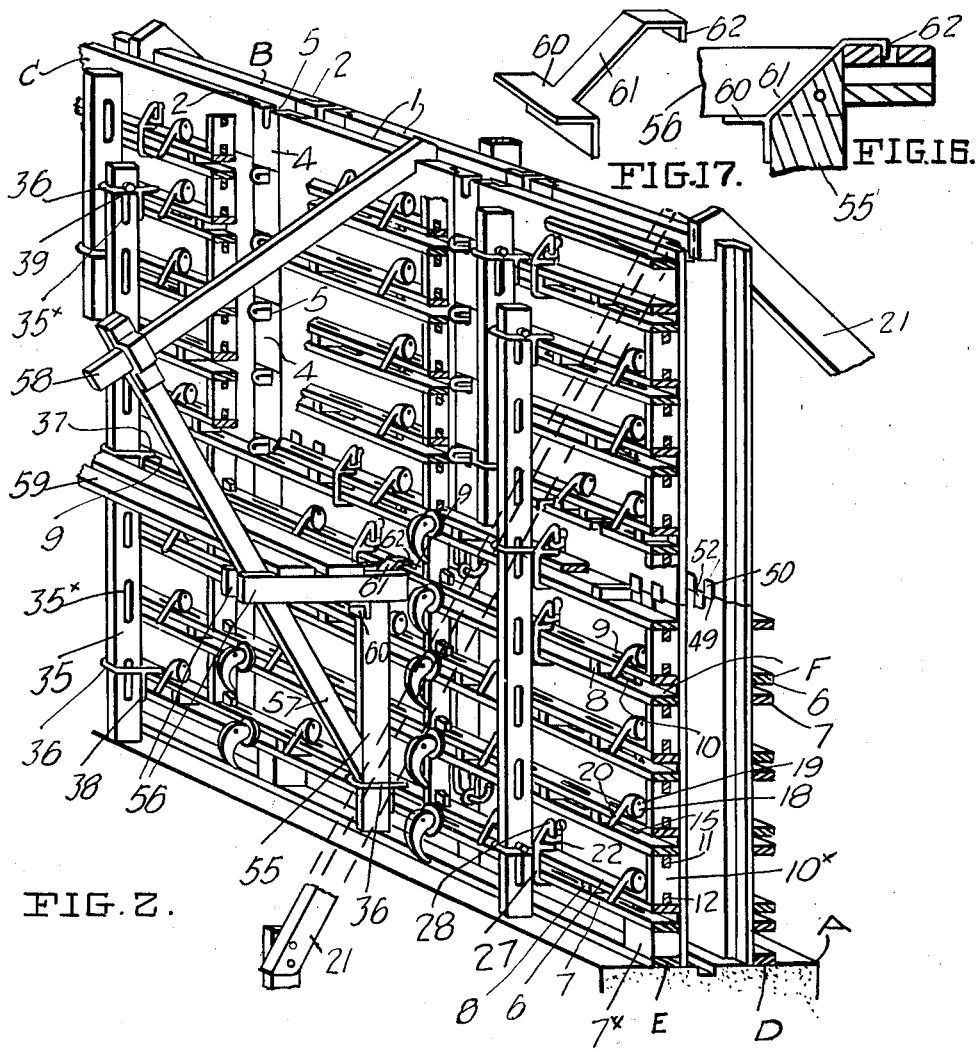
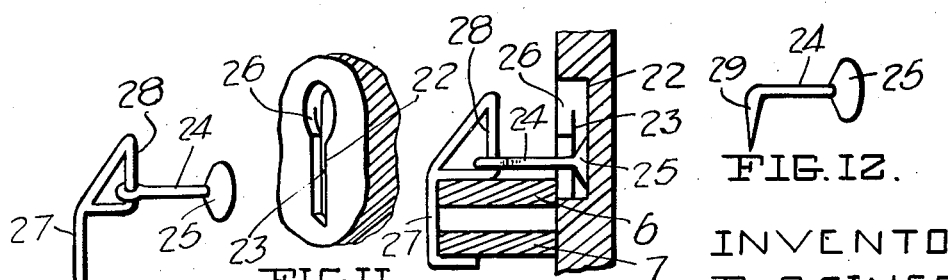
INVENTOR
F. REINER
BY
ATTORNEYS Oct. 19, 1943.   F. REINER   2,332,166
FORM FOR MAKING CONCRETE WALLS
Filed May 25, 1942   6 Sheets-Sheet 3
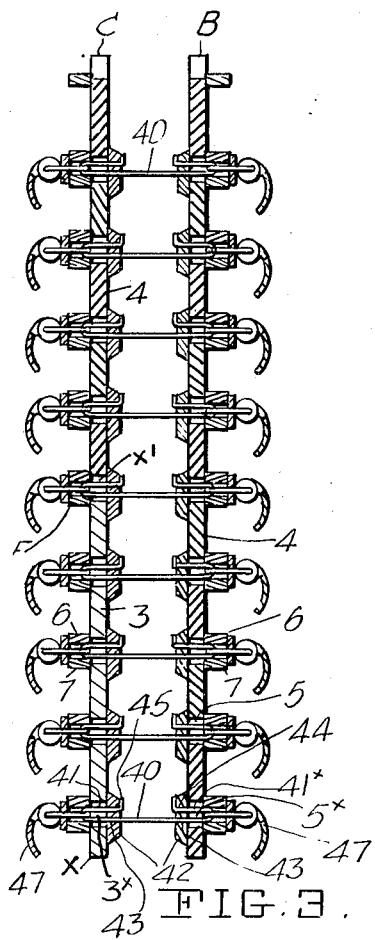
FIG. 3.
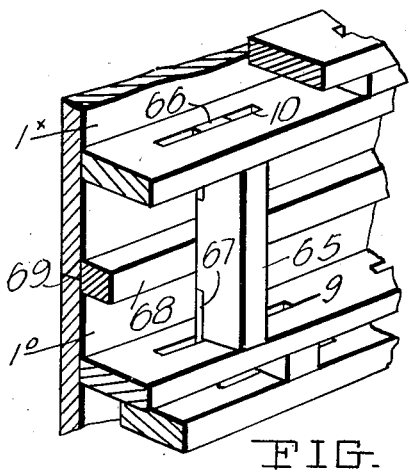
FIG. 25.
FIG. 26.   FIG 14
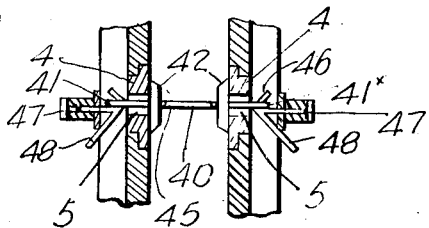
FIG. 4.
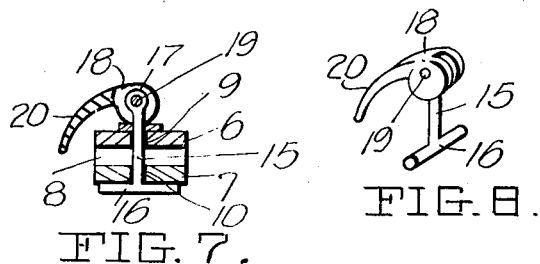
FIG. 7.   FIG. 8.
INVENTOR
F. REINER
BY
ATTORNEYS Oct. 19, 1943.　　　　F. REINER　　　　2,332,166
FORM FOR MAKING CONCRETE WALLS
Filed May 25, 1942　　　　6 Sheets-Sheet 4
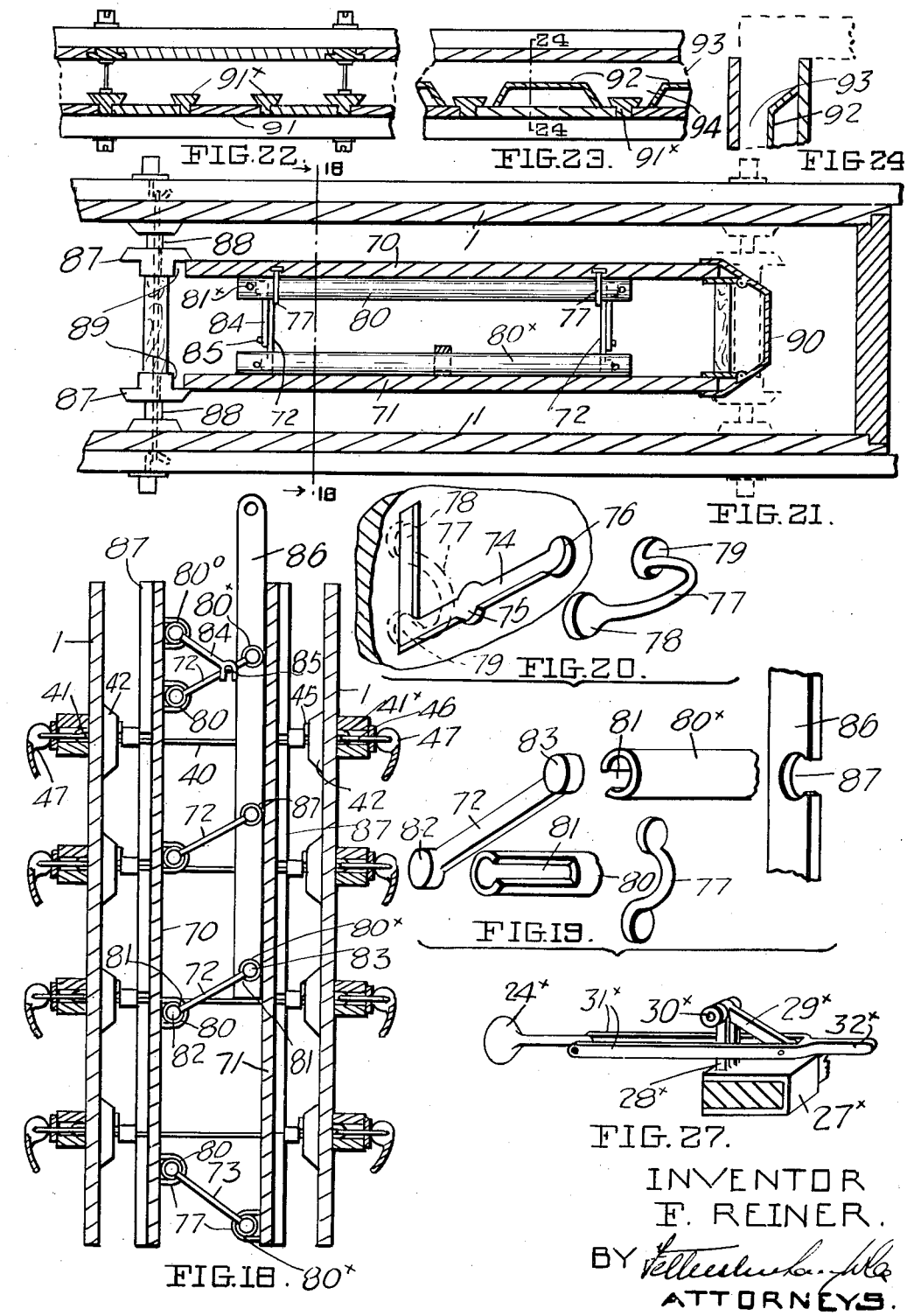
INVENTOR
F. REINER.
BY
ATTORNEYS.

Oct. 19, 1943.            F. REINER                 2,332,166
                   FORM FOR MAKING CONCRETE WALLS
                      Filed May 25, 1942          6 Sheets-Sheet 5
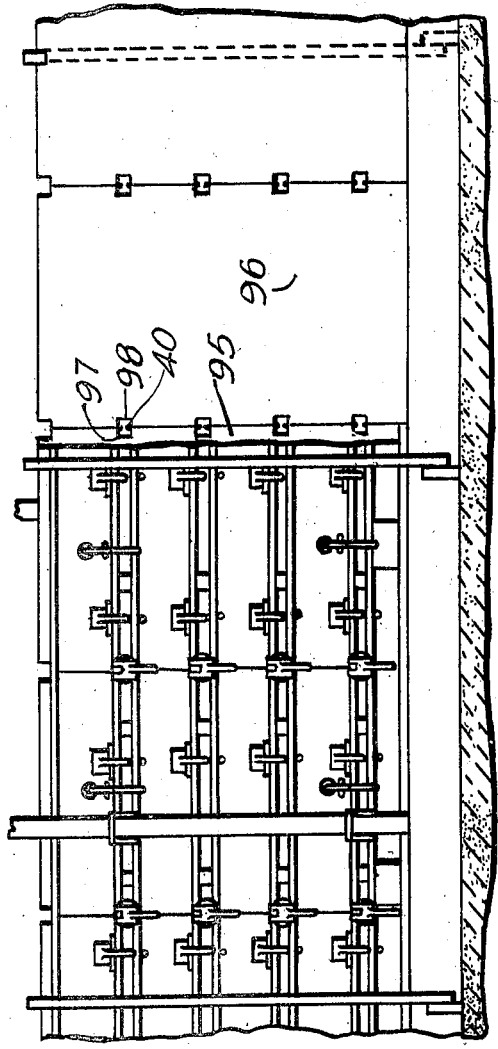
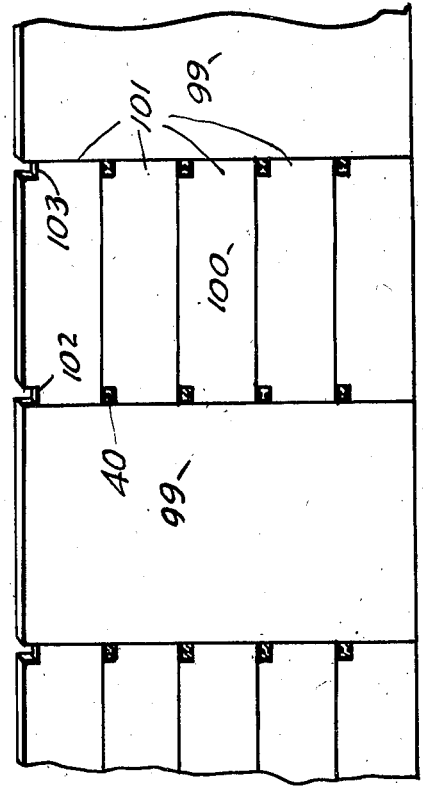
INVENTOR
F. REINER.
BY
ATTORNEYS Oct. 19, 1943.   F. REINER   2,332,166
FORM FOR MAKING CONCRETE WALLS
Filed May 25, 1942   6 Sheets-Sheet 6

INVENTOR
F. REINER.
BY
ATTORNEYS

Patented Oct. 19, 1943

2,332,166

UNITED STATES PATENT OFFICE 2,332,166

FORM FOR MAKING CONCRETE WALLS

Frederick Reiner, York Mills, Ontario, Canada

Application May 25, 1942, Serial No. 444,385
In Canada February 11, 1942

2 Claims. (Cl. 25—131)

My invention relates to improvements in forms for making concrete walls and the like, and the objects of the invention are as follows:

First, the devising of a form which is flexible so as to be readily adaptable to the construction of a wall of any desired area.

Second, the elimination of lumber wastage produced by cutting or re-cutting of the lumber transferred from job to job to make it suitable for use in each job and also by the spoiling of the lumber resulting from the tearing apart of a nailed together form.

Third, the obviating of holes in the form walls bored at each job for the insertion of tie wires and the consequent weakening of the form.

Fourth, the elimination of metal wastage produced by throwing away of used and therefore bent nails, and the substitution of securing means which may be used repeatedly without damage to the form or to themselves, and further saves the time expended in driving nails.

Fifth, the provision of a collapsible core used in conjunction with the walls of the form for producing hollow walls.

Sixth, the provision of a scaffold bracket construction which may be quickly and detachably mounted on any portion of the form and together with the aforesaid objects the provision of a strong, durable and rigid structure which may be quickly assembled or disassembled and on which no work has to be done on the job other than the erecting or dismantling of the form.

The invention consists essentially of an inner and outer wall each comprising spaced apart vertically set panels having undercut vertical inner edges, strips fitting the undercut edges, horizontal and vertical liners, and detachable means for securing the strips to the liners, the strips serving as spacers between the panels of the form, ties forming spacers between the form walls and means for detachably securing the horizontal to the vertical liners.

Fig. 1 is a perspective view of a portion of an outer wall of a wall form during construction.

Fig. 2 is a view similar to Figure 1 showing the inner and outer walls of the form.

Fig. 3 is a sectional view through a portion of an inner and outer wall taken through the panel connecting strips and the spacer ties.

Fig. 4 is a sectional plan of the parts shown in Fig. 3.

Fig. 5 is a sectional detail of the means for locking the panels and connecting strips together.

Fig. 6 is a perspective detail of the locking mechanism employed in Fig. 5.

Fig. 7 is a sectional view through a horizontal liner and its locking mechanism.

Fig. 8 is a perspective detail of the locking mechanism employed in Fig. 7.

Fig. 9 is a sectional view through a portion of a panel and liner and showing the means for locking them together.

Fig. 10 is a perspective detail of the locking mechanism shown in Fig. 9.

Fig. 11 is a detail of the keyhole slot coacting with the mechanism illustrated in Fig. 10.

Fig. 12 is a detail of an alternative form of locking mechanism coacting with the slot of Fig. 11.

Fig. 13 is a perspective view of the means for connecting the horizontal and vertical liners together.

Fig. 13a is a sectional view showing a horizontal and vertical liner connected by the means shown in Fig. 13.

Fig. 14 is a perspective detail of the means for aligning the lower edge of an upper panel with the upper edge of a lower panel.

Fig. 15 is a perspective detail of a tie spacer.

Fig. 16 is a sectional detail of the supporting tie of a scaffold bracket and the parts coacting therewith.

Fig. 17 is a perspective detail of the tie shown in Fig. 16.

Fig. 18 is a sectional view through a wall form and containing core.

Fig. 19 is a perspective detail of the parts employed in Fig. 18.

Fig. 20 illustrates the hinge mounting used in Fig. 18.

Fig. 21 is a plan view of the parts shown in Fig. 18.

Figs. 22 and 23 are plan views of alternative constructions.

Fig. 24 is a sectional view on line 24—24 Fig. 23.

Fig. 25 is a means for supporting the horizontal opposing edges of panels when located between liners.

Fig. 26 is a perspective detail of the spacer separating the horizontal liners.

Fig. 27 is an alternative form of lock which may be used in place of that shown in Fig. 9.

Fig. 28 shows an alternative form of panel construction in elevation and showing a portion of the second erected wall member in front of the first erected wall member.

Fig. 29 is a view in perspective of a portion of the second erected wall member looking at the inner face thereof.

In the drawings like characters of reference indicate corresponding parts in each figure.

Figure 30:
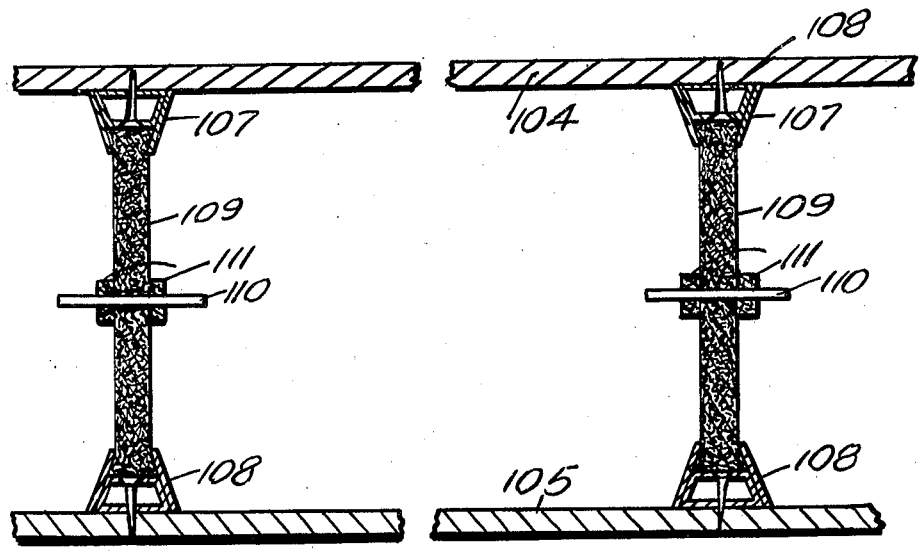
Fig. 30 is a plan view of a form adapted for use when erecting a longitudinally expandible wall.

A indicates the footing upon which a wall is to be built. B and C are the outer and inner wall members of the form. D and E are wood strips secured to the footing at each side of its centre.

Each wall portion B and C comprises panels 1 which may be made of ordinary wood or plywood with undercut vertical edges 2 and strips 3 and 4 which are inserted between the panels and fit the undercut edges of two adjacent panels. The undercut edges are preferably in the form of rabbet grooves but may be of any other form which will provide undercut edges or the undercut edges may be entirely dispensed with as illustrated in Fig. 29.

The lower series of panels of the outer wall member are separated by complete strips 3 extending from X to X' (see Fig. 3) the full height of the panel and are provided with orifices $3^x$ for the tie wires hereafter described. The remaining strips 4 are equal in length to the distance between the horizontal liners F. Notches 5 are formed at the upper ends of each strip 4 through which tie wires extend.

The liners F are formed by upper and lower scantling members 6 and 7 held apart by cross pieces 8 which are loosely placed on the lower member 7 and upon which the upper member 6 is then placed. Each of the members 6 and 7 are provided with longitudinal slots 9 and 10 suitably spaced apart. The member 7 of the lowermost liner rests on blocks $7^x$ which are placed on the footing strip D or E carrying the wall members B or C.

The liners are spaced apart by verticals $10^x$ provided with upper and lower cross pieces 11 and 12 which bear respectively against the upper and lower faces of the members 6 and 7 at each side of the slots 9 and 10 and pins 13 and 14 which project into the slots 9 and 10 of the upper and lower members 6 and 7 of adjacent liners F.

The members 6 and 7 are secured together by the following locking device (see Figs. 7 and 8) which consists of a rod 15 having a T shaped lower end 16 and an eyed upper end 17 in which is pivoted a cam 18 by a journal pin 19. Each cam is operated by a lever 20.

In assembling the T-end is set longitudinally of the slots 9 and 10 and then passed through the slots and then turned to the right angular position transversely of the slots as shown. As the lever arm 20 is forced downward the cam 18 and T 16 pinch the members 6 and 7 together.

The panels 1 are held in position by the struts 21, which are of the required length to engage the upper edge of the panel of the desired tier. The struts 21 engaging the upper edge of the lower tier before the erection of the upper tier is illustrated by dotted lines and those engaging the upper edge of the second or upper tier being illustrated by full lines. When the liners are built to the top of the panel of the lower tier, the panel is secured to the liners near its upper and lower edge by the following device.

A keyhole slot 22 (see Fig. 11) is formed in the centre of the panel adjacent its upper and lower edge (see Fig. 1). The keyhole extends partially through the panel the slotted portion of the keyhole being undercut on each side at 23. An eye bolt 24 is provided with a conical head 25 which is passed through the circular portion 26 of the keyhole 22 and is then forced down to the position shown in Fig. 9 to engage the undercut sides 23 of the slot.

A bracket formed by a portion 27 embraces the outer edge of a liner member 6 and has an upstanding portion 28 on which the eye of the bolt 24 slides. When the bolt is slid vertically on the portion 28 it engages the undercut portions 23 and so locks the panel and liner together until the structure is complete.

Instead of the bracket 27 and its portion 28 the bolt 24 may be provided with a spike 29 (see Fig. 12) which is driven into the liner member 6.

A preferred form of the lock to that illustrated in Fig. 9 is shown in Fig. 27. In this figure a bracket $27^x$ engages the upper member 6 of the liner and is provided with a double standard $28^x$. $29^x$ is a link pivoted at its upper end between the members of the standard $28^x$ on a pin $30^x$. $31^x$ is a double lever pivoted to the lower end of the link $29^x$ which is downwardly inclined when in the locking position and is formed at its front end into a handle $32^x$. The lever is pivoted at its opposite end to the conically headed bolt $24^x$ which engages a key slot of a form similar to that shown in Fig. 11. By this device when the handle $32^x$ is thrown down the panel engaged by the headed bolt $24^x$ is drawn in tight to the liner when for any reason the panel does not fit directly against the liner when set up.

When the lower panels of the outer wall are placed in position the strips 3 are placed between them so as to engage the undercut edges of the panel and are held in place by the device illustrated in detail in Figs. 5 and 6.

30 is a keyhole slot formed in the outer face of the strip 3 adjacent each end. The slot 30 is similar to the slot 22 previously described. A bolt 31 similar to the bolt 24 engages the slot 30 and in the vertically set eye of the bolt is journalled a rocking rod 32 provided with cam ends 33 engaging the outer faces of the panels at each side of the strip. The rod 32 is provided with a lever arm 34. When the arm 34 is swung to the vertical position shown, the cam portions 33 engage the panels and draws the bolt 31 outwardly, and the strip 3 into tight engagement with the panels.

In order to hold the wall in vertical alignment vertical lines 35 are provided in the form of scantling having longitudinal slots $35^x$. The vertical liners are held in place by brackets 36 illustrated in Fig. 13 the U-shaped portion of which embraces the outer portion of the liner and the downwardly projecting portions 37 engage the longitudinal slots 9 of the horizontal liners. The downwardly projecting portions 38 bear against the outer face of the horizontal liners and brace the parts. A pin 39 extends through a slot $35^x$ so as to rest on the side portions of the bracket 36 and support the liner from vertical movement.

After the lower portion of the outer wall B has been built as above described, the lower portion of the inner wall C is built in substantially the same manner and tied to the outer wall by a device which I will now describe.

As before stated the remaining strips 4 are short strips provided with end notches which notches are in line with the interspace between the upper and lower members 6 and 7 of the liners F.

Referring particularly to Figs. 3 and 15—

Wires 40 are bent at their ends into loop form as at 41 and 41×. Previously to the bending of the wire washers 42 having central orifices 43 and eccentrically placed orifices 44 are slipped onto the wire which passes through the central holes 43 and is then bent into the loops 41 and 41×, the extreme ends being then passed through the orifices 44 and bent upward at 45 thereby locking the wires from inward movement. The washers are cone frustum so as to readily pull out of the concrete.

Referring to Fig. 3, the looped end 41 of each tie wire is passed through an orifice 3× of the strip 3 so as to project into the interspace between the liner members 6 and 7. The lowermost short strip 4 of the wall B is then placed in position. The lowermost strip 4 is provided with an orifice 5×. The looped end 41× of the lowermost wire 40 is passed through the orifice 5× and the looped end of the next wire through the notch 5 to project into the interspaces between the two lowermost liner members. A hook 46 manually grasped by the handle 48 is passed between the liner members to engage each loop 41 and 41× to which is pivotally connected a cam lever 47. When the tie wire is in position and the lever 47 pressed down the liners and struts are forced inward against the spacer washers 42 locking the parts together and definitely spacing the wall members B and C apart. When this operation is complete another strip 4 and tie wire 40 is secured in position the operation being repeated a tie wire passing through each notch 5, until the top of the panel is reached.

In setting up the upper tiers of panels it is necessary to use some device to hold the lower edges of the upper panel in contact with the upper edge of the lower panel previously set up. Preferably I use a device shown in Fig. 14 which is made from a channel piece 49 having the centre portions of the channel walls 50 and 51 turned down as at 52 and 53. Before setting the upper tiers in place the upper edge of the lower tier is engaged between the portions 52 and 53 as indicated in Fig. 2, and the lower edge of the upper panel inserted between the portions 50 and 51 thereby preventing the upper panel slipping out of position. When the upper panels are set up they are held in position by the temporary braces 21 until the parts are bound together by the tie wires as previously described. Also between panel and panel of the newly set up tier a channel member 54 extends across the interspace and holds the panels in a line one with the other until the connecting strips of the wall C and B are held together by the tie wires.

In conjunction with my wall construction I employ a scaffold bracket on which the scaffold boards 59 rest. Each scaffold bracket comprises a vertical bar 55 from each side of the upper end of which extend horizontal bars 56. 57 is an inclined scantling secured at its lower end to the bar 55 and its intermediate portion between the bars 56. The scantling 57 extends upward a suitable height to carry a brace 58 engaging the upper edge of an upper panel. The brackets carry boards 59 forming a platform on which the workmen stand to erect the upper liners.

To attach the bracket to the lower liners an angle piece 60 is inserted in the angle between the bars 55 and 56. A strip 61 welded to the angle piece extends up at an incline between the bars 56 as clearly shown in Fig. 16 and is provided with a downturned end 62 hooking into a slot 9 of an upper liner member 6.

The lower end of the bar 55 is secured to the liner by a bracket 36 of the type disclosed in Fig. 13.

In some cases the line of contact between an upper and lower panel 1× and 1° as in Fig. 25 is located between liners and not behind the upper member of the liner as previously illustrated in Figs. 1 and 2. In Figure 25 a bar 65 extends between two liners to which are secured plates 66 and 67 fitting into the slots 10 and 9 of the liners. Between the bar 65 a covering strip 68 is fitted covering the line of contact 69 between the upper and lower panels preventing any tendency to movement at the joint by outward pressure.

In Figures 18 to 21 is illustrated a collapsible core used for making a wall having hollow insulating air spaces in the wall. The core comprises opposing walls 70 and 71 which are hingedly connected together by the downwardly inclined arms 73 at their lower end permitting the walls to swing together towards the top of the core. Arms 72 are pivotally mounted on the wall 70.

The walls 70 and 71 are provided with undercut angular slots 74 (see Fig. 20) having two entrance openings 75 and 76. 77 is a saddle strap having circular ends 78 and 79 adapted to pass through the entrance openings 75 and 76 into the horizontal arm of the slot 74 and is slid into the position indicated by dotted lines in the vertical arm of the slot. 80 and 80× are tubes having end slots 81. Each arm 72 and 73 has a head at each end as indicated at 82 and 83 which slip into the tubes 80 and 80× and the arm slips into the slots 81 of the tubes. The tubes 80 and the lowermost tube 80× pass through the saddle brackets 77 at each end of the walls 70 and 71.

The arms 72 are free of the wall 71 and are held from movement by the hook bar 84 having a head at one end fitting the tube 80× and engaging at its opposite end a pin 85 on the uppermost arm 72. 86 is a pull bar having orifices 87 through which the tube 80× pass. When the hook bar 84 is disengaged from the pin 85 the pull bar 86 is pulled upward to swing up the arms 72 and so allow the walls 70 and 71 to collapse together. The bars 72 and 75 and the lock bar 84 are held in the slots 81 by cotter pins 81× (see Fig. 21).

Notched bars 87 engage the tie wires 40 and are held in place by the spacer sleeves 88. The bars 87 form rabbet grooves 89, which form guideways for the walls 70 and 71 of the collapsible form as it is slid downward when locked in the uncollapsed position between the side walls of the mold.

In cases in which a window or other opening is located in the wall the form must be provided with an end wall 90 which slips onto the end of the core and extends the full height of the core so as to form a wall between the core end and window frame when the concrete is poured.

In Fig. 22 the connecting strips 91× between the panels 91 are formed to key into the concrete so that when the form is dismantled the strips 91× are left in the concrete and form a support to carry sheeting which is nailed thereto to form air spaces on the inside of the wall.

In Figures 23 and 24 means are illustrated to form the wall of rib construction which may be used in conjunction with the construction shown in Fig. 22. The panels 91 of these figures carry hollow wooden protuberances 92 which indent the wall to make the wall body thin at 93 and form ribs 94 between the thin wall portions and in which the strips 91× are keyed.

In Figs. 28 and 29 I have shown a modified form of panel construction. In this form the first erected wall member is formed by complete panels 95 and 96, the vertical edges of which abut together and are provided with opposing notches 97 and 98 through which the tie wire 40 previously described extend. Although I have shown opposing notches 97 and 98 the notches might be formed completely in the edge of one panel only the edge of the abutting panel being straight and unnotched.

The second erected wall member is formed as illustrated in Fig. 29 in which panels 99 formed with straight unnotched vertical edges are employed and instead of intervening spacer strips horizontally divided panels 100 horizontally divided are employed. The panels 100 are divided horizontally into panel portions 101 corresponding to the strip portions 4 and are provided with notches 102 and 103 formed on their upper edges. The notches 102 and 103 are horizontally opposite to the notches 97 and 98 to permit the passage of the opposite end of the tie wire 40. Vertical and horizontal liners, as previously described, are employed in conjunction with the panels 95, 96, 99 and 100 in substantially the same manner as that previously described.

Figure 31:
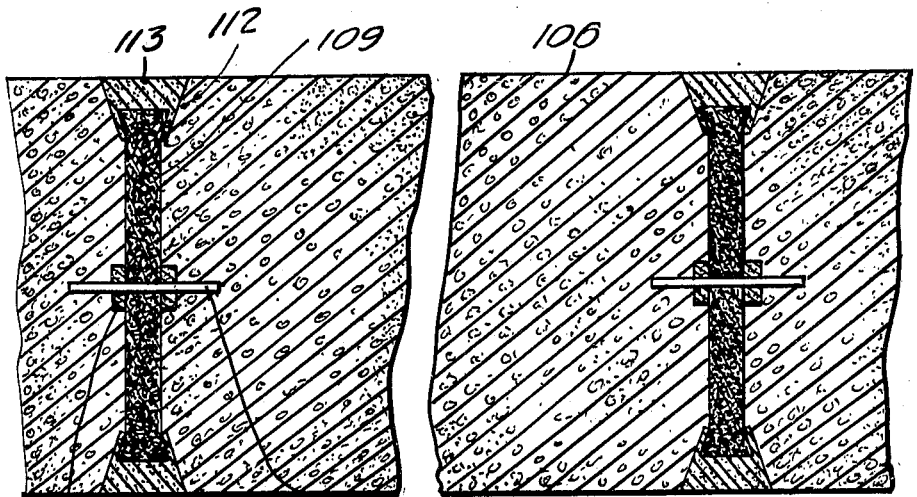
Fig. 31 is a plan view of a portion of an expandible wall as made in the form illustrated in Fig. 30.

In Figs. 30 and 31 I have shown a means for permitting free contraction of a wall due to climatic or other conditions. In this construction 104 and 105 are the walls of the form in which the wall 106 is constructed. 107 and 108 are channel members secured to the inner faces of the wall members 104 and 105 in opposing position and spaced a suitable distance apart as illustrated. These channels preferably taper inward and are provided with filling pieces 108 formed integral therewith.

Into the opposing channels 107 and 108 is slipped a dividing wall 109 formed of bituminous material which will allow of the free expansion and contraction of the wall which is thereby formed in block sections free to move longitudinally of the wall due to expanding or contracting action. To prevent vertical movement I employ metal pins 110 secured in fibre pieces 111 forming part of the wall 109 such pins being well oiled before the concrete is poured not to impede the free horizontal movement of the wall and yet prevent its vertical movement.

When the wall is set and the form removed the recesses 112 formed by the removal of the channels 107 and 108 are filled with cement 113.

From the foregoing description it will be seen that I have devised a form which is readily adaptable to form a wall of any desired area.

In order to lengthen the walls the strips 3 and 4 may be of any desired width. The walls may be increased in height by inserting a panel equal in height to the spacing between the liners, thus increasing the height above the normal panel height and inserting a corresponding strip 4. Any number of extra panel portions and strips to make the wall the required height may be used.

I have also devised a form construction in which there is no nail or lumber wastage, no boring of holes in the panels to weaken the panels, and by which the form is quickly erected or dismantled and is strong and durable.

When dismantling the form the loops of the tie wires are cut off and the loop and washer pulled out of the concrete. The cut end of the wire is then bent into the hole left by the removed washer and the hole filled.

What I claim as my invention is:

1. In a wall form, the combination with a pair of opposing wall members each provided with horizontally spaced apart panels having their inner surface width less than their outer surface width, horizontally spaced apart liners bearing against the outer face of each member, and vertical strips fitting in the interspaces between the panels to form flush inner wall surfaces, the strips of one wall members being divided into sections extending between points located slightly below the upper surface of each liner and having notches formed in an end of each section, and the opposing strip being in length equal to the height of the panel and having orifices therein in a line with the aforesaid notches, and tie wires extending through each pair of aligned notches and orifices and liners supporting each wall member and adapted to space the members definitely apart and simultaneously secure each wall member to its corresponding liners.

2. In a wall form, the combination with a pair of adjacent horizontal liners having vertically aligned orifices therein, of spacer strips, extending between the liners having projections extending into the orifices to hold the strips in place.

FREDERICK REINER.